United States Patent [19]

Peters

[11] 4,041,970

[45] Aug. 16, 1977

[54] QUICK BLEED EXHAUST VALVE

[75] Inventor: Clifford M. Peters, Longview, Tex.

[73] Assignee: ACF Industries, Incorporated, New York, N.Y.

[21] Appl. No.: 694,510

[22] Filed: June 9, 1976

[51] Int. Cl.[2] .............................................. F16K 45/00

[52] U.S. Cl. ..................................................... 137/102

[58] Field of Search ........................................... 137/102

[56] References Cited

U.S. PATENT DOCUMENTS

| | | | |
|---|---|---|---|
| 2,717,612 | 9/1955 | Affleck | 137/102 |
| 2,816,563 | 12/1957 | Pappas | 137/102 |
| 3,464,321 | 9/1969 | Piotrowski, Jr. | 137/102 |
| 3,827,451 | 8/1974 | Roob | 137/102 |
| 3,967,635 | 7/1976 | Sealfon et al. | 137/102 |

*Primary Examiner*—William R. Cline
*Assistant Examiner*—H. Jay Spiegel
*Attorney, Agent, or Firm*—Eugene N. Riddle

[57] ABSTRACT

A fluid exhaust valve for connection between a fluid actuator and a fluid supply for the quick bleeding of fluid from the fluid actuator. The exhaust valve has a piston valve member mounted for movement in a valve chamber between open and closed positions relative to an exhaust port in fluid communication with the valve chamber. An internal passageway through the piston valve member has a separate check ball valve therein to permit the flow of fluid from the fluid supply to the fluid actuator when the ball valve is open and to prevent a reverse flow from the actuator to the inlet passage when the ball valve is closed while permitting the piston valve member to be fully exposed to the fluid pressure of the actuator. When the inlet flow pressure from the fluid supply is reduced, a fluid pressure differential is quickly reached on opposite faces of the piston valve member adequately to move the piston valve member to an open position of the exhaust flow passage for the rapid exhaust of fluid from the actuator through the exhaust port.

3 Claims, 3 Drawing Figures

FIG. 1
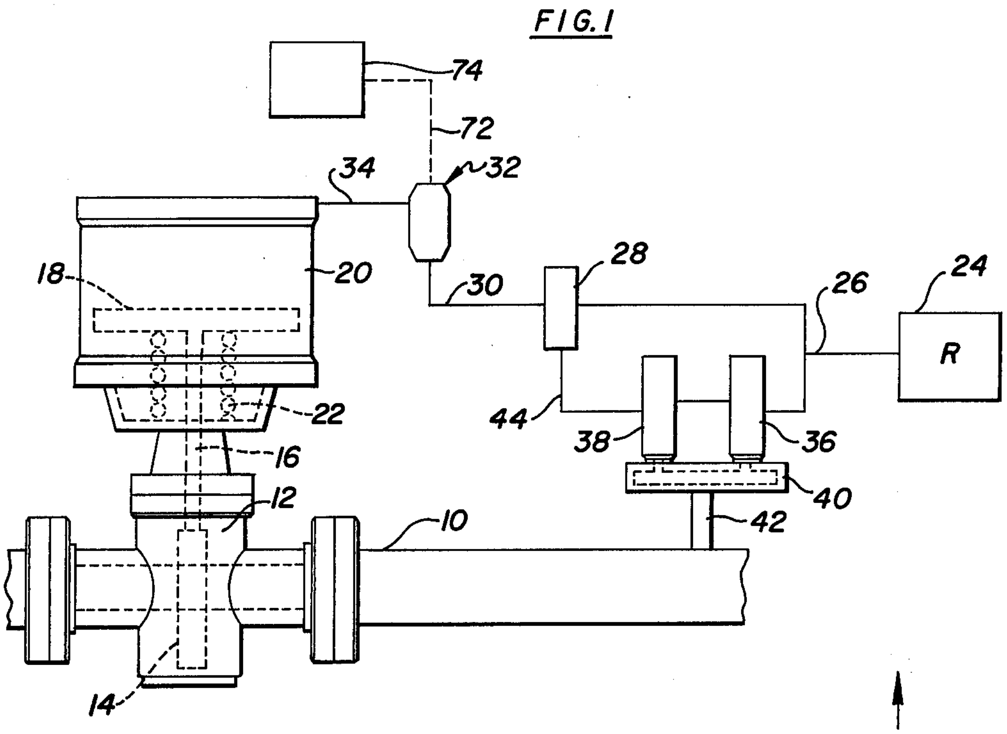
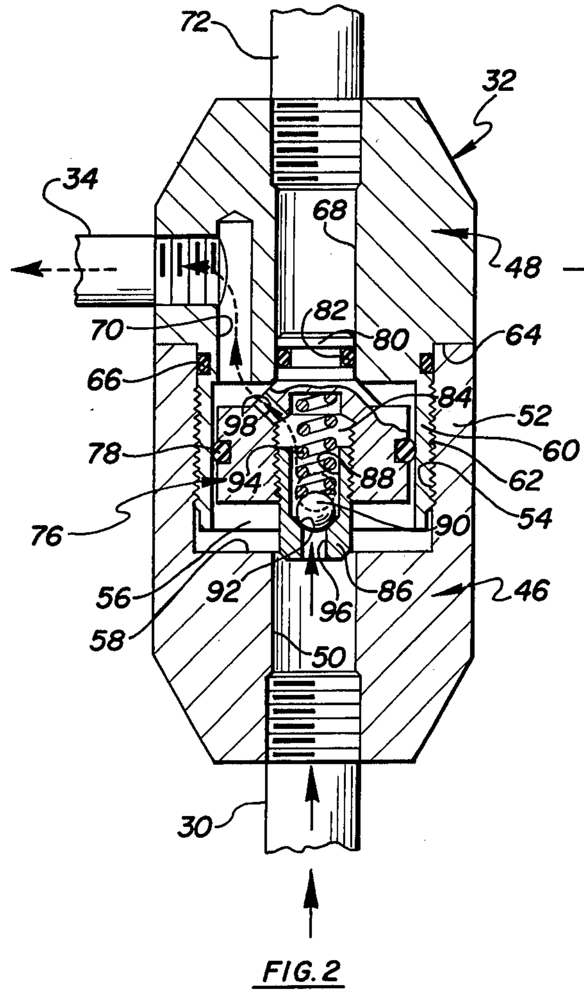
FIG. 2
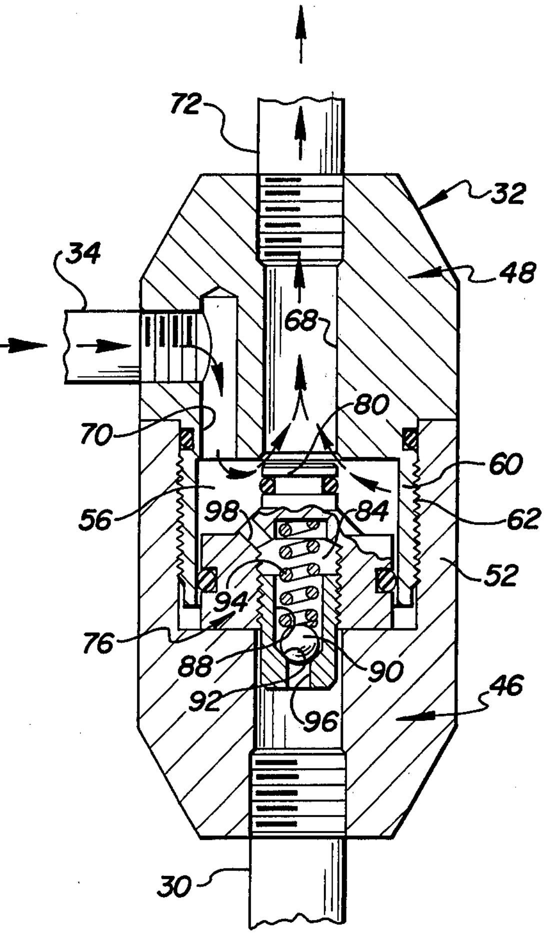
FIG. 3

QUICK BLEED EXHAUST VALVE

BACKGROUND OF THE INVENTION

A bleed valve has been provided heretofore in the fluid line between a fluid actuator and a fluid supply to permit the bleeding of fluid from the fluid actuator. However, particularly where a long fluid line extends between the fluid supply and the fluid actuator for a valve, such as provided in subsea operations with the fluid supply located on an offshore platform, a relatively long period of time is required to reduce the line pressure in the fluid line to the bleed valve sufficiently to dump the air or other fluid from the actuator for closing the main flow line valve. It is highly desirable that the main valve controlled by the actuator be moved to a closed position as fast as possible after a predetermined fluid pressure is reached at which time it is desired to shut down the flow through the flowline. Thus, a quick bleed exhaust valve for the actuator is highly desirable for exhausting fluid from the actuator to permit a quick closing of the main valve. Heretofore, bleed valves have been provided in order to effect a relatively fast exhaust of fluid from the valve actuator under certain conditions but, as previously mentioned, with long fluid supply lines the bleed exhaust valves have required a substantial time before a sufficient pressure differential is provided to actuate the exhaust valve.

DESCRIPTION OF THE PRESENT INVENTION

The present invention is directed to a quick bleeding exhaust valve for connecting between a fluid actuator and a fluid supply to provide a fast bleeding of fluid from the fluid actuator even though a long supply line extends between the exhaust valve and the supply source. The fluid exhaust valve comprising the present invention includes a body with inlet, outlet and exhaust flow passages; and a piston valve member movable between open and closed positions of the exhaust flow passage. The piston valve member has an internal fluid passage therethrough and a ball check valve carried by the piston valve member is mounted within the internal fluid passage to permit flow from the inlet to the outlet flow passage and quickly closing upon any decrease in fluid pressure from the inlet flow passage. When the ball valve member is in a closed position the entire rear bore of the piston valve member is exposed to fluid pressure from the actuator and upon a decrease in fluid pressure in the inlet flow passage the fluid pressure against the entire rear bore of the piston valve member quickly moves the piston valve member to an open position of the exhaust port to bleed rapidly the fluid pressure from the actuator or thereby to permit a very rapid closing of the valve member controlled by the actuator.

The fast build up of the fluid pressure differential on opposite faces of the piston valve member is provided by the closed check valve member in the internal passageway through the piston valve member.

It is an object of the exhaust valve of the present invention to exhaust the fluid in a fluid actuator controlling a gate valve as quickly as possible after a reduction in fluid pressure in the inlet to the exhaust valve so that the gate valve may move to a closed position in a minimum of time after the fluid pressure in a main flow line is outside a predetermined operating range.

DESCRIPTION OF THE DRAWINGS

An embodiment illustrating the present invention is shown in the accompanying drawings, forming a part of the specification, wherein:

FIG. 1 is schematic of the quick bleed exhaust valve comprising the present invention arranged in a safety system to control the opening and closing of a gate valve in a main flow line;

FIG. 2 is an enlarged longitudinal section of the quick bleed exhaust valve shown in FIG. 1 with the bleed valve shown in a closed position preventing fluid communication between the fluid actuator and the exhaust passage; and FIG. 3 is a longitudinal section similar to FIG. 2 but showing the bleed valve in an open position with the fluid being exhausted from the actuator through the exhaust flow passage.

Referring now to the drawing for a better understanding of this invention and more particularly to FIG. 1, the quick bleed exhaust valve of the present invention is illustrated in a safety system for closing a valve across a main flow line or conduit shown at 10, for the conveying of a primary fluid. A gate valve shown generally at 12 has a gate member 14 therein positioned for movement between open and closed positions relative to main flow line 10. A stem 16 has its lower end connected to gate valve member 14 and its upper end is connected to a fluid actuator including a piston 18 mounted within a cylinder 20. A spring 22 continuously urges piston 18 toward a closed position of gate valve member 14. Gate valve member 14 is shown in an open position in FIG. 1. A reservoir 24 supplies fluid through line 26, a bypass valve 28, and an inlet line 30 to quick bleed exhaust valve 32 comprising the present invention. Fluid through exhaust valve 32 and line 34 to actuator 20 moves piston 18 to the position shown in FIG. 1 and holds piston 18 and gate valve member 14 under fluid pressure in an open position.

A low pressure pilot valve 36 and a high pressure pilot valve 38 are mounted on a base or manifold 40. A branch line 42 connects flow line 10 with manifold 40 to communicate line pressure to manifold 40 which is in fluid communication with low pressure pilot 36 and high pressure pilot 38. Low pressure and high pressure pilots 36 and 38 are in a normally open position and in this position, pilot fluid is supplied from reservoir 24 to pilots 36, 38 and through pilot fluid line 44 to bypass valve 28. Bypass valve 28 in its normal position communicates actuator fluid pressure from reservoir 24 through line 26. Low pressure pilot 36 and high pressure pilot valve 38 are maintained in open position in a fluid pressure operating range which may be predetermined. Upon the reaching of a predetermined low pressure, low pressure pilot valve 36 will move to a closed position to exhaust fluid to atmosphere from line 44 to permit gate valve member 14 to move to a closed position under the bias of spring 22. Likewise, when a predetermined high fluid pressure is reached in conduit 10, high pressure pilot 38 moves to a closed position to exhaust fluid to atmosphere likewise resulting in the movement of gate valve member 14 to a closed position. For further details of the operation of pilot valves 36 and 38, reference is made to U.S. Pat. No. 3,034,331, the entire disclosure of which is incorporated by this reference. Lines 26 or 30 may under certain conditions be of a relatively long length such as might occur when the reservoir is located on an offshore platform and the valve and actuator are in a subsea location.

As shown in FIGS. 2 and 3, exhaust pilot valve 32 comprises a body having a female section 46 and a male section 48. Female section 46 includes an inlet flow passage 50 connected to line 30 and an outer cylindrical sleeve 52. Sleeve 52 is internally threaded at 54 and defines a valve chamber 56 with an annular abutment 58 therein forming a valve seat at one end of valve chamber 56.

Male body section 48 has a cylindrical extension 60 with external screw threads 62 thereon and is received in and threaded to sleeve 52 of female section 46. An annular abutment 64 adjacent extension 60 is in engagement with the extending end of sleeve 52. O-ring 66 provides a fluid-tight seal between sleeve 52 and cylindrical extension 60. Valve chamber 56 is also formed by and defined by the space within the volume defined by extension 60 and is in fluid communication with an exhaust flow passage 68. Valve chamber 56 is in fluid communication with an outlet flow passage 70 in male body section 48 which is connected to line 34 extending to the actuator. Exhaust passage 68 is shown as connected to an exhaust line 72 leading to a sump 74 which is particularly desirable when hydraulic fluid or some other liquid fluid is provided. In the event air is employed in the system shown in FIG. 1, exhaust flow passage 68 may simply open to atmosphere without a separate line being provided to a sump.

Mounted for movement within valve chamber 56 is a piston valve member generally indicated at 76 and having a generally cylindrical main body with an O-ring 78 extending about its outer circumference to form a seal with the adjacent surface defining extension 60. Piston member 76 has a cylindrical extension 80 on one end thereof adapted to be received in exhaust passage 68 and having an O-ring seal 82 therearound to seal exhaust passage 68 from valve chamber 56 when extension 80 is received within exhaust passage 68. An intermediate frusto-conical portion of valve member 76 connects the cylindrical main body of valve member 76 and the small diameter cylindrical extension 80. As shown in FIG. 2, the intermediate frusto-conical portion of valve member 76 engages an annular abutment at the end of valve chamber 56 when fluid is supplied to exhaust valve 32 to space the cylindrical main body from the opposed abutment. Piston member 76 has a central internally threaded bore 84 and an externally threaded check valve housing 86 is threaded within bore 84. Housing 86 has a ball valve chamber 88 therein and a ball valve member 90 is adapted to seat in a closed position on seat 92. A spring 94 in central bore 84 urges continuously ball valve member 90 to a closed position. An inlet opening 96 in housing 86 exposes ball valve member 90 to fluid pressure from inlet flow passage 50. An outlet opening 98 through the frusto-conical portion of piston member 76 provides fluid communication between ball valve member chamber 84 and outlet flow passage 70. Thus, inlet opening 96, chamber 84, and outlet opening 98 form an internal passageway through piston valve member 76 to permit the flow of fluid from line 30 to line 34 when ball valve member 90 is unseated by a higher pressure in line 30 than line 34.

Referring to FIG. 3, piston valve member 76 is shown in the position when fluid pressure in line 34 is greater than fluid pressure in line 30 thereby to move valve member 76 to a position with extension 80 removed from exhaust flow passage 68 thereby to provide fluid communication between line 34 and exhaust flow passage 68 to permit the exhaust of fluid from actuator 20.

In operation, with piston valve member 76 in the position shown in FIG. 2, fluid is supplied from reservoir 24 through lines 26 and 30 to exhaust valve 32. Check valve member 90 is unseated and fluid is supplied to actuator 20 through inlet opening 96 and outlet opening 98 thereby to move gate valve member 14 to open position with piston 18 in the down position as shown in FIG. 1. In the event of a fluid pressure being reached in flowline 10 outside of the predetermined operating range for which low pressure and high pressure pilot valves 36 and 38 have been set, pilot valve 36 or pilot valve 38 will be actuated to exhaust pilot fluid in line 44 and to move bypass valve 28 to an exhaust position for line 30. Upon a reduction in fluid pressure in line 30, ball valve member 90 will seat under the bias of spring 94 which will effect a rapid build up of fluid pressure behind ball valve member 90 from line 34 thereby to move piston valve member 76 to the position shown in FIG. 3 in a minimum of time. In this position, extension 80 is withdrawn from exhaust passage 68 and fluid from actuator 20 and line 34 is exhausted through exhaust passage 68 as shown in FIG. 3 thereby to permit piston 18 to move to an upper position under the bias of spring 22 to close gate valve member 14 and block the flow of fluid through flow passage 10.

From the foregoing, an exhaust valve has been provided to permit a quick build up of a pressure differential between the inlet and outlet flow passages as a result of check valve 90 being provided in an internal passageway through the main piston valve member.

What is claimed is:

1. A fluid exhaust pilot valve for connection between a fluid actuator and a fluid supply for quick bleeding of fluid from the fluid actuator comprising:

a generally cylindrical valve body having an axial longitudinally extending inlet flow passage for connection to the fluid supply and a transversely extending outlet flow passage for connection to the fluid actuator, said valve body having a valve chamber between the inlet and outlet flow passages with said flow passages at opposite ends of the valve chamber and an exhaust passage in fluid communication with the outlet side of said valve chamber and in axial alignment with the inlet flow passage;

a valve member slidably mounted in said valve chamber for movement between open and closed positions relative to said exhaust passage and exposed on opposite sides thereof to inlet and outlet fluid pressures, said valve member having a large diameter cylindrical main body, a small diameter cylindrical extension extending axially from the main body, and a generally frusto-conical intermediate connecting portion between the extension and the main body;

said valve chamber having opposed annular abutments on which said valve member is seated at said open and closed positions, said valve member having a central bore extending from one end of the main body to said intermediate portion and an outlet opening through said intermediate portion to the valve chamber to provide fluid communication between the central bore and the valve chamber, said small diameter extension fitting within the exhaust passage in the closed position of said valve member to block fluid flow thereto and said intermediate portion of the valve member being seated on an end of the valve chamber and permitting fluid communication between the outlet opening and said outlet flow passage at said closed position;

a check valve member in said central bore to permit fluid flow from said inlet passage to said outlet passage and to prevent any reverse flow from the outlet passage to the inlet passage, said valve member being moved to a closed position of the exhaust passage and remaining in the closed position when the fluid pressure in the outlet flow passage is greater than the fluid pressure in the inlet flow passage, said check valve member being in a closed position when the fluid pressure in the inlet passage reaches an amount less than the fluid pressure in the outlet passage to permit a rapid relatively large pressure differential on opposite sides of the valve member and a fast movement of the valve member to its open position thereby opening the exhaust passage for bleeding fluid from the outlet flow passage.

2. The fluid exhaust valve as set forth in claim 1 wherein said generally cylindrical valve body includes male and female sections threaded to each other and forming the valve chamber therebetween receiving the slidable valve member, said female body section having an outer cylindrical sleeve and said male body section having an inner circumferential cylindrical extension threaded into the sleeve, and said check valve member having a housing forming a check valve chamber and being threaded within the central bore of said valve member, said housing having a valve seat therein for receiving the check valve member in seated position.

3. The exhaust valve as set forth in claim 2 wherein said male body section has a longitudinal bore therethrough forming the exhaust passage and said female body section has a longitudinal bore therethrough forming the inlet flow passage.

* * * * *